(12) United States Patent
Watanabe et al.

(10) Patent No.: US 7,684,897 B2
(45) Date of Patent: Mar. 23, 2010

(54) ROBOT PROGRAM GENERATING DEVICE AND ROBOT PROGRAM ANALYZING DEVICE

(75) Inventors: Atsushi Watanabe, Tokyo (JP); Kazunori Ban, Yamanashi (JP); Ichiro Kanno, Yokohama (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 1209 days.

(21) Appl. No.: 11/239,672

(22) Filed: Sep. 30, 2005

(65) Prior Publication Data

US 2006/0074526 A1   Apr. 6, 2006

(30) Foreign Application Priority Data

Oct. 1, 2004   (JP)   ............................ 2004-289822

(51) Int. Cl.
*G06F 19/00*   (2006.01)
(52) U.S. Cl. .......................... 700/245; 700/42; 700/48; 700/246; 700/250; 700/253; 706/1; 706/2; 706/3; 706/4; 706/6; 717/101; 717/104; 717/106; 717/109; 717/113
(58) Field of Classification Search ................. 700/193, 700/245, 254, 259, 250, 253, 264, 42, 48, 700/246, 258; 318/568.1, 568.11, 568.13, 318/568.15, 573, 568.23, 632; 901/3, 4, 901/9, 23, 42, 47; 29/407.04, 430; 219/130.01, 219/124.34; 376/261; 53/244; 706/1, 2, 706/3, 4, 6, 8, 13, 14, 15, 16, 46, 47, 52; 717/101, 104, 106, 109, 113, 114, 120, 124, 717/136, 172

See application file for complete search history.

(56) References Cited

U.S. PATENT DOCUMENTS 4,620,436 A * 11/1986 Hirabayashi et al. ......... 73/1.15

(Continued)

FOREIGN PATENT DOCUMENTS

JP   2003-34430   2/2003

*Primary Examiner*—Khoi Tran
*Assistant Examiner*—McDieunel Marc
(74) *Attorney, Agent, or Firm*—Drinker Biddle & Reath LLP

(57) ABSTRACT

A work model (or an image) is displayed on an image plane of a robot simulator (201), and a measuring portion and a measuring method are designated (202, 203) and a work shape and a work loading state are designated (204), and then it is judged whether or not the measuring portion and the measuring method are good (205). When the measuring portion and the measuring method are good, a program is generated and the processing is completed (207, 208). When the measuring portion and the measuring method are not good, an alarm is given (206), and the continuation (207) or the repetition (201) of the processing is directed. At the time of analyzing the program, the loading (101), the analysis and display of the measuring portion and the measuring method (102, 103) and the work information (104) are designated, and then it is judged whether or not the measuring portion and the measuring method, which have been analyzed, are good (105). When the measuring portion and the measuring method are good, the processing is finished (107). When the measuring portion and the measuring method are not good, an alarm is given (106), and either the completion of the processing (107) or the correction of the program (201) is selected. Due to the foregoing, a burden imposed for raising and maintaining the visual sensor robot system can be reduced.

8 Claims, 13 Drawing Sheets

U.S. PATENT DOCUMENTS

| | | | |
|---|---|---|---|
| 4,799,170 A * | 1/1989 | Nakaya et al. | 700/258 |
| 5,473,532 A * | 12/1995 | Unno et al. | 700/32 |
| 5,656,906 A * | 8/1997 | Iwashita et al. | 318/568.23 |
| 5,778,549 A * | 7/1998 | Campanile | 33/503 |
| 5,983,166 A * | 11/1999 | Matsumoto et al. | 702/152 |
| 6,043,621 A * | 3/2000 | Neumann | 318/568.11 |
| 6,133,545 A * | 10/2000 | Okazaki et al. | 219/124.34 |
| 6,272,479 B1 * | 8/2001 | Farry et al. | 706/13 |
| 6,836,702 B1 * | 12/2004 | Brogardh et al. | 700/245 |
| 7,130,718 B2 * | 10/2006 | Gunnarsson et al. | 700/254 |
| 7,236,963 B1 * | 6/2007 | LaMuth | 706/46 |

* cited by examiner

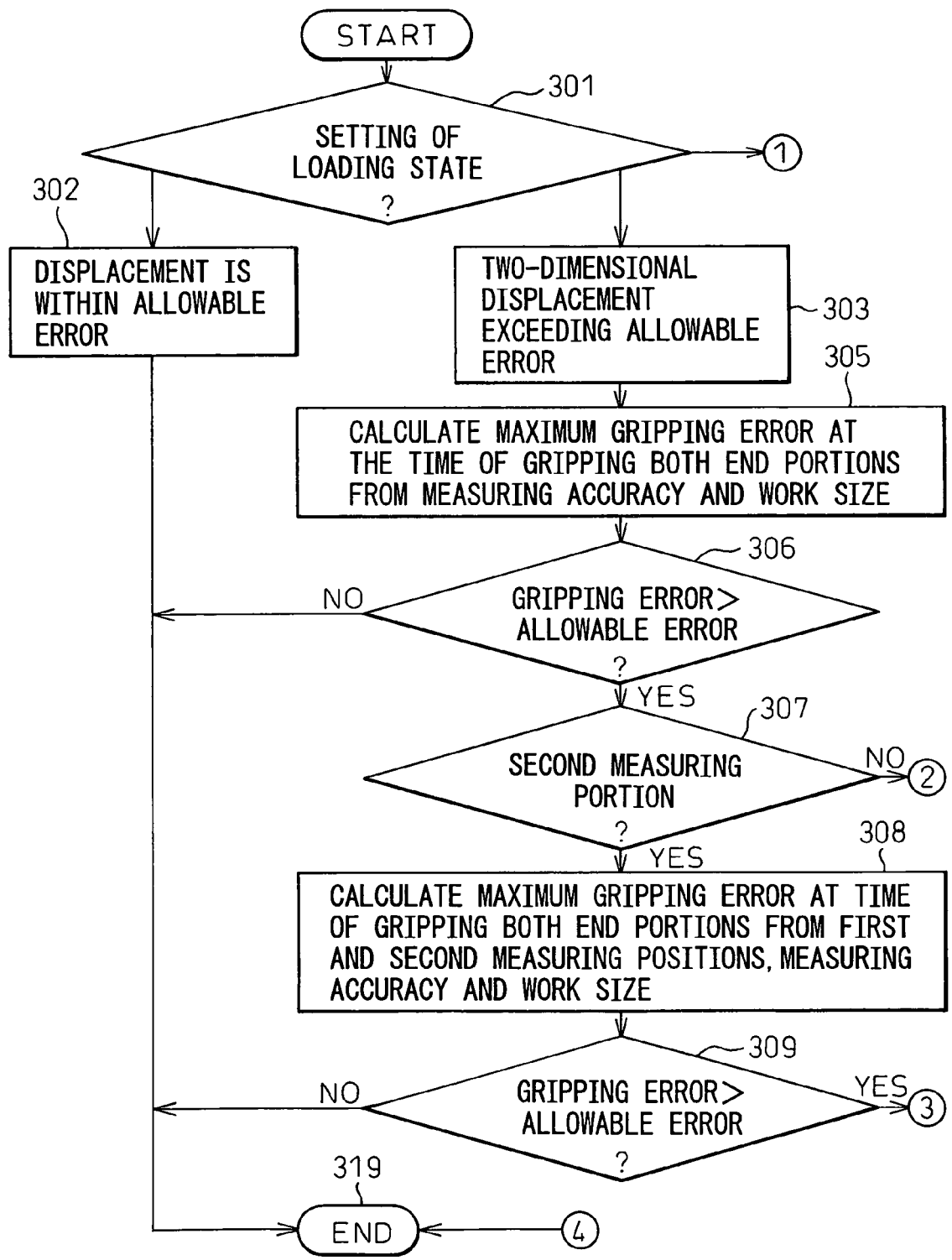

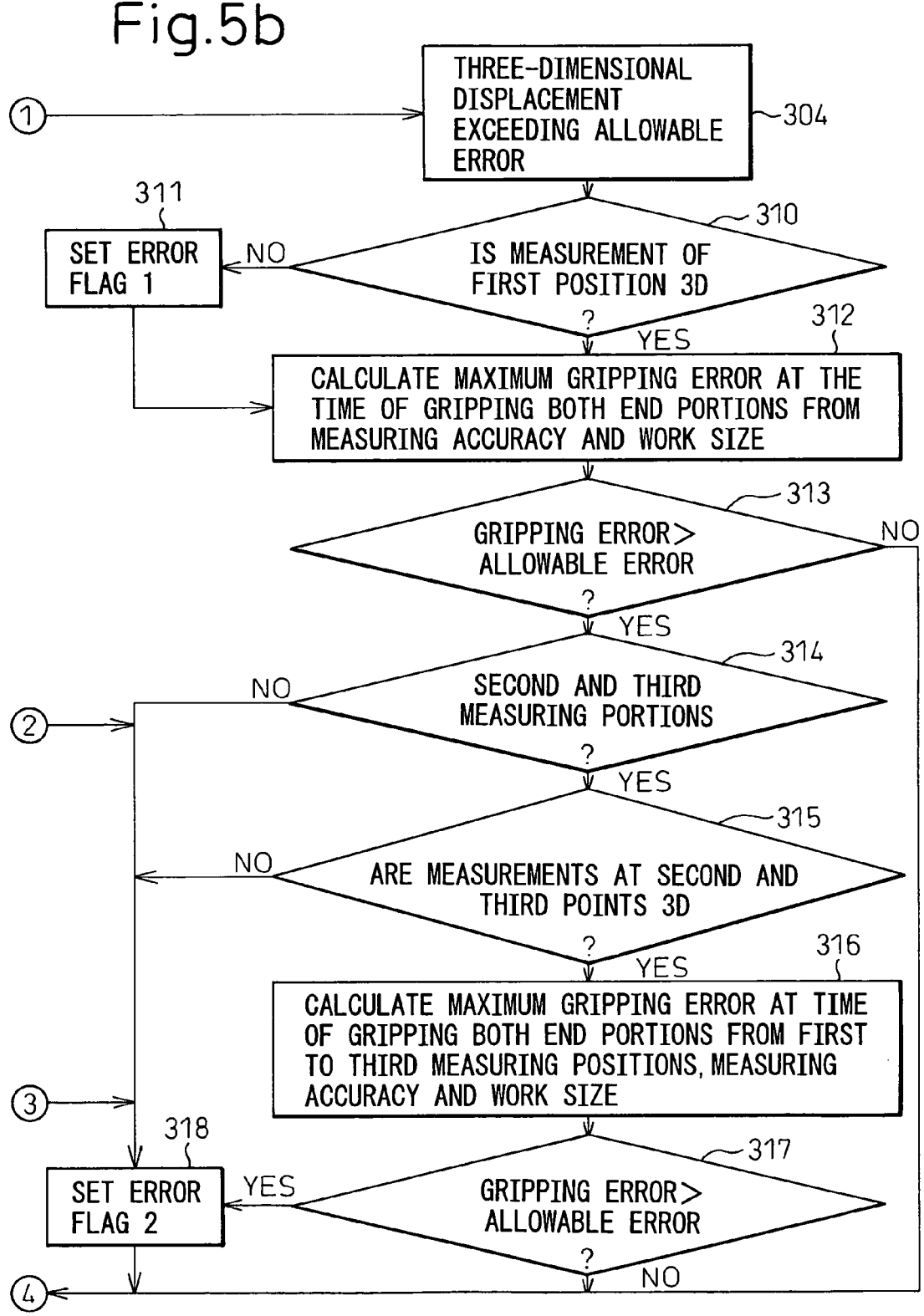

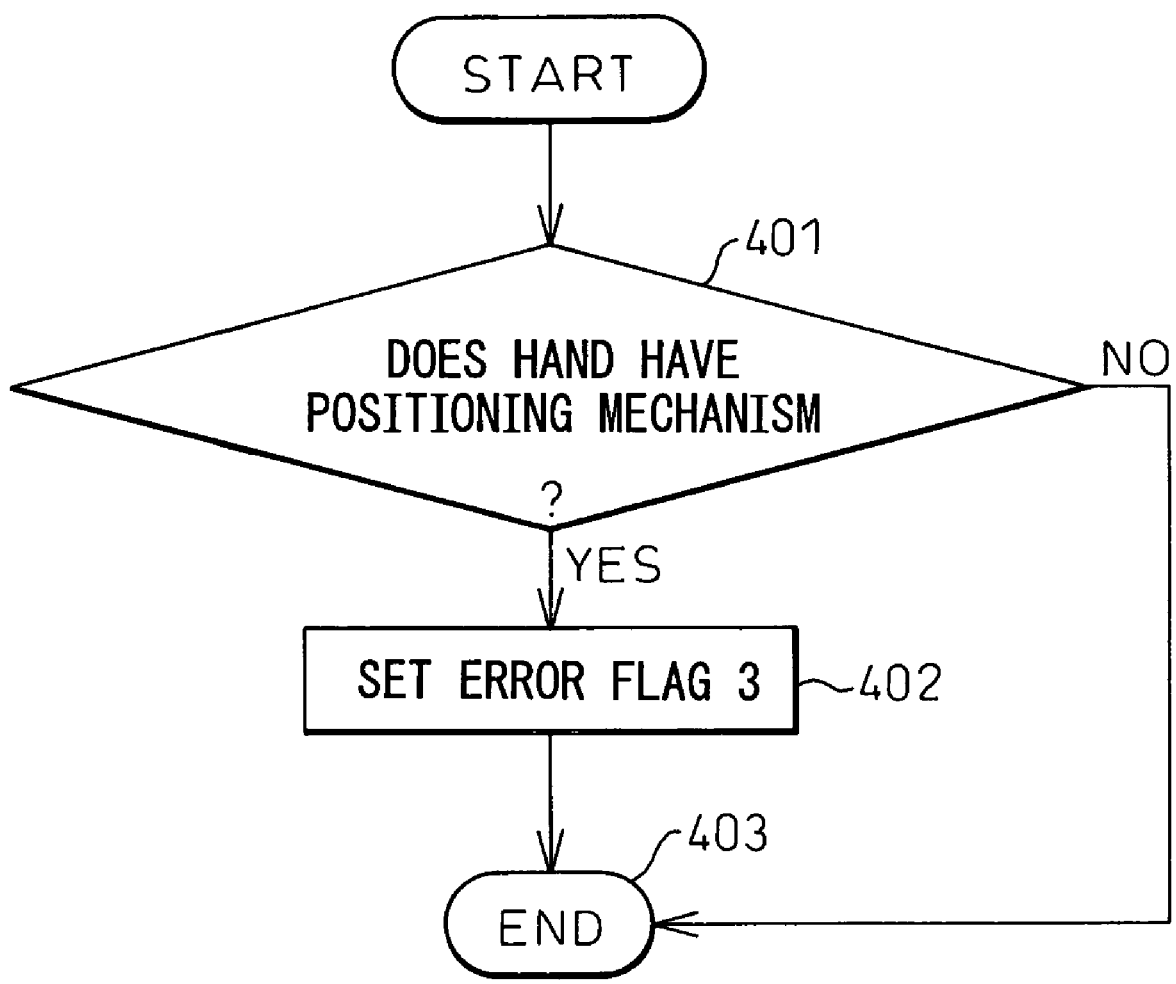

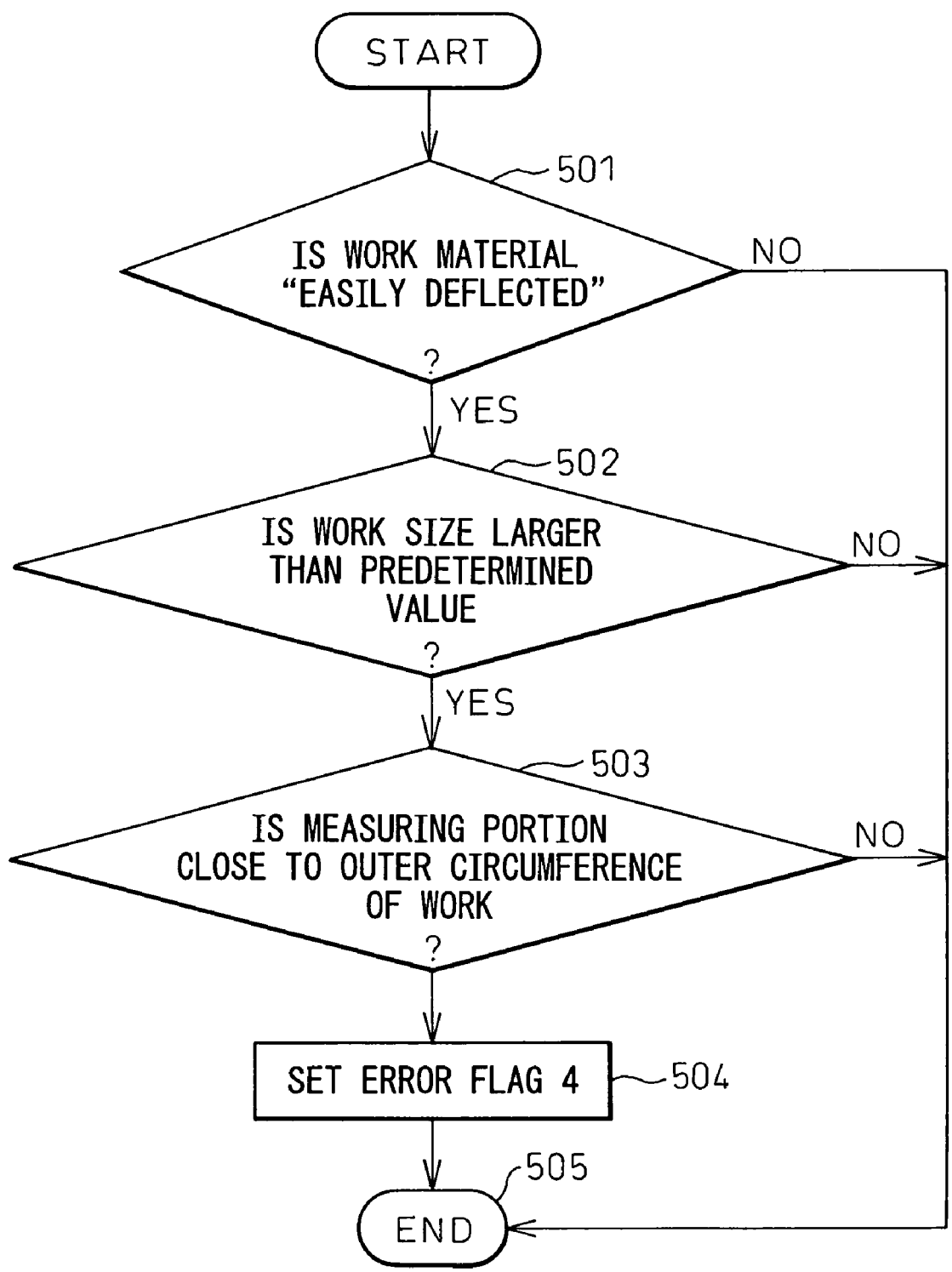

Fig.8
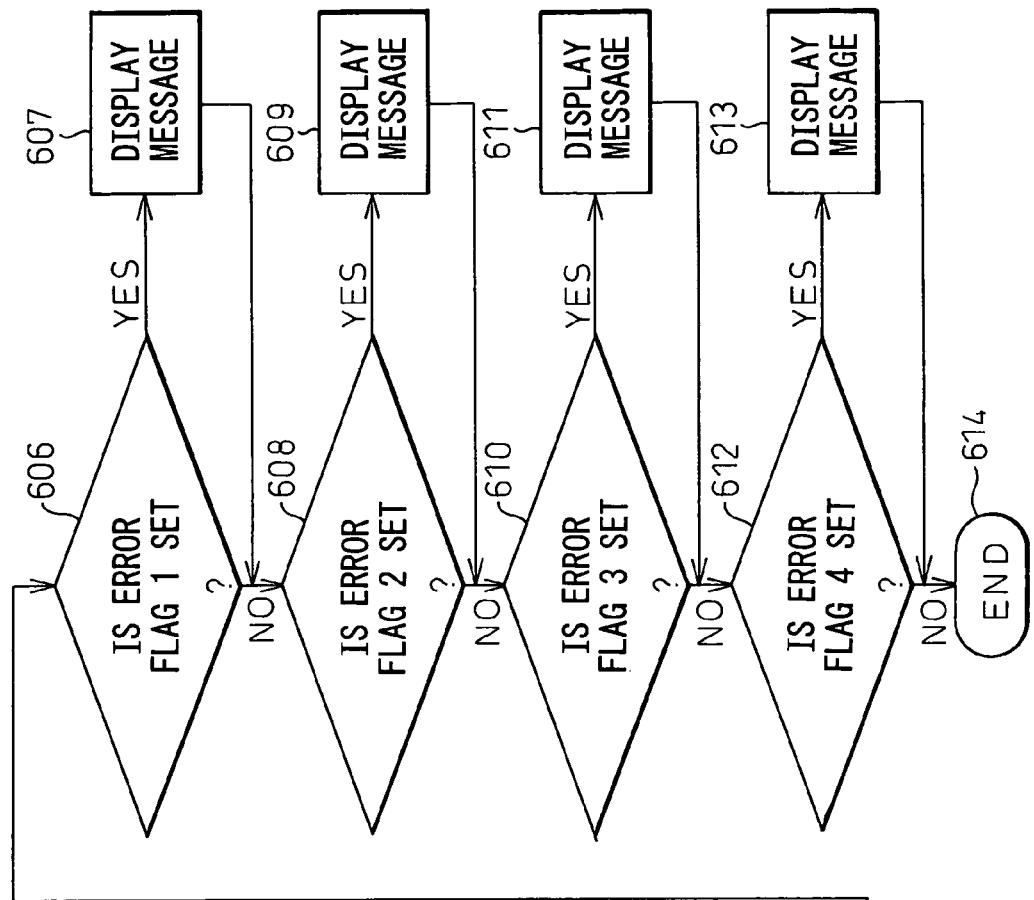
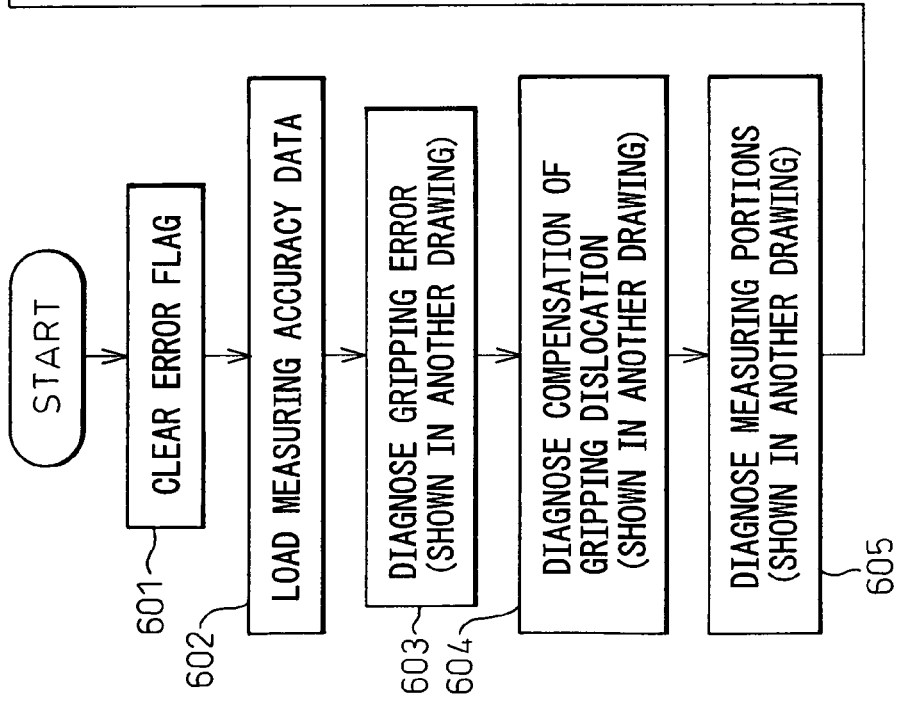

Fig.9
1) IN THE CASE OF ONE MEASURING PORTION
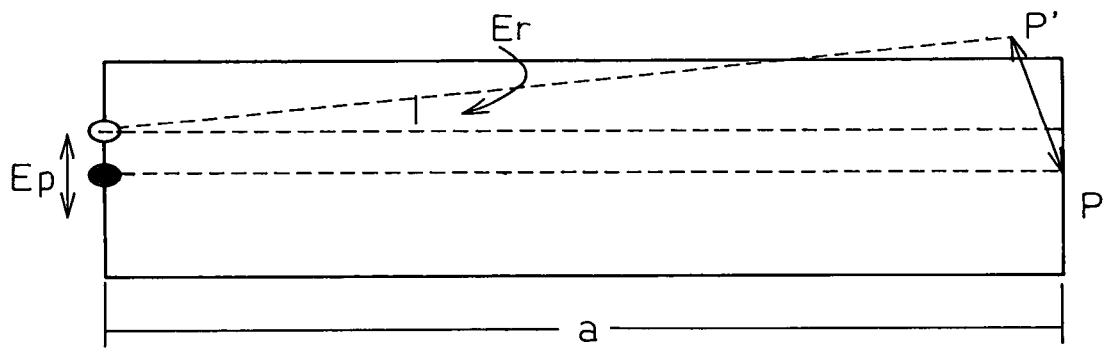
2) IN THE CASE OF A PLURALITY OF MEASURING PORTIONS
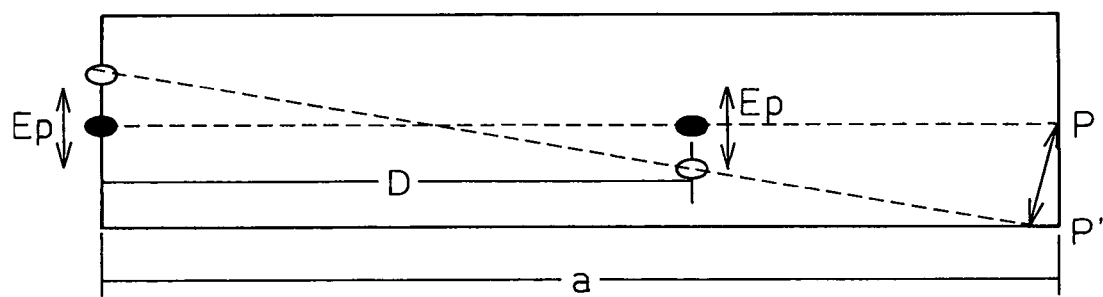

Fig.10
1) IN THE CASE OF ONE MEASURING PORTION
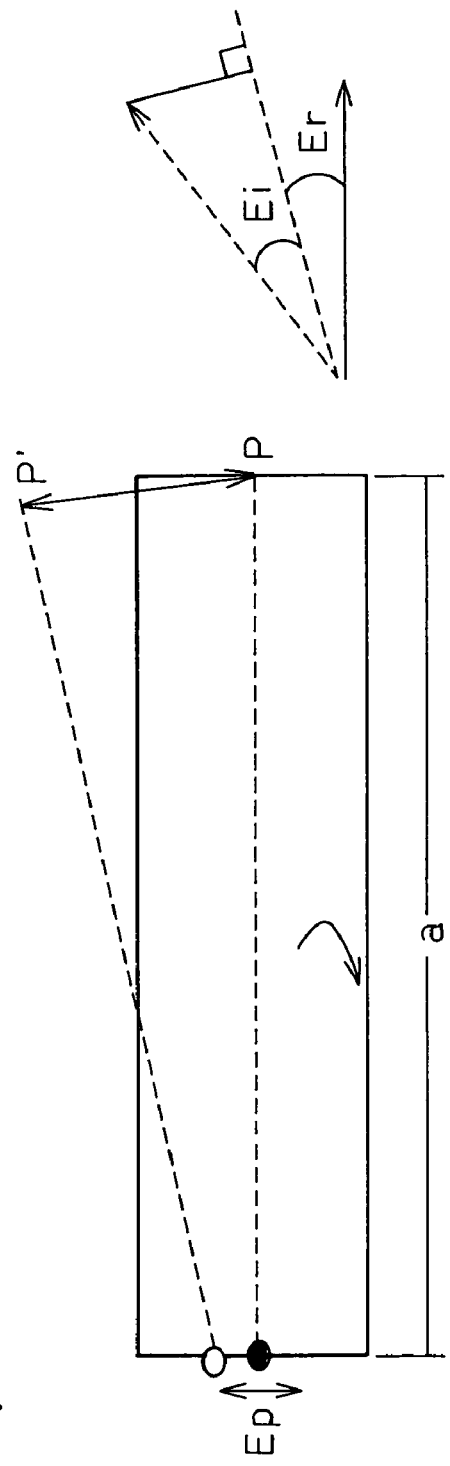
2) IN THE CASE OF A PLURALITY OF MEASURING PORTIONS
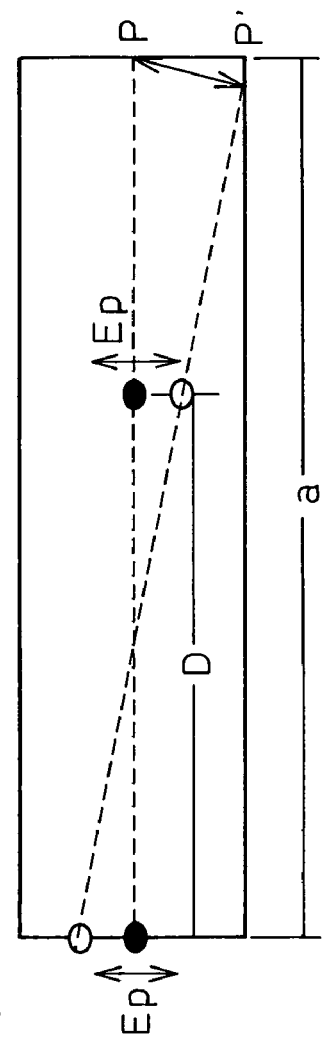

ROBOT PROGRAM GENERATING DEVICE AND ROBOT PROGRAM ANALYZING DEVICE

BACKGROUND OF THE INVENTION

1. Field of the Invention

The present invention relates to a device for generating a robot program and also relates to a device for analyzing a robot program. More particularly, the present invention relates to a robot program generating device for generating a robot program useful for effectively raising a production system in which a robot and visual sensor are used or for generating a robot program useful for maintaining the production system after it has been raised. The present invention also relates to a robot program analyzing device for analyzing the robot program.

2. Description of the Related Art

There has already been provided a production system including a process in which a fixed camera or a movable camera mounted on a robot is used as an image snapping means for a visual sensor together with a robot and in which a large number of parts, which are not arranged in order, are successively taken out and conveyed to the next process. This production system has already been put into practical use under appropriately determined conditions. This robot-visual sensor system for handling a large number of parts, which are not arranged in order, is going to enter into a practical phase from a trial phase recently so as to spread into various applications. For example, as disclosed in the Japanese Unexamined Patent Publication No. 2003-34430, the operation of a system, the practical use of which has been conventionally assumed to be difficult, has now started.

However, in the case of the above application in which the visual sensor is used, it is necessary to select a measuring position and measuring method conducted by a visual sensor while consideration is being given to the object of the work to be done and the size and shape of a workpiece to be handled. Therefore, a heavy burden is imposed on the operator. For example, assume a case in which a visual sensor is used, the measurement accuracy represented by the visual angle range of which is 0.5°, in order to grip both end portions of a work of 2 m long by a robot hand. In the case where both end portions of the work are gripped by the robot hand after only one end portion of the work has been measured using the visual sensor, the measuring accuracy of which is 0.5°, a gripping error at the other end portion is not less than 17 mm (2000 mm×2×π×0.5/360). Accordingly, the selection of the above measuring point and measuring method is not appropriate unless a handling mechanism capable of absorbing the above error is used. In this case, it is necessary to conduct a measurement on the other end portion of the work so as to reduce the error caused in the measurement.

In the case where it is impossible to ensure the detection accuracy since a difference between individuals of the shape of the characteristic portion to be used as the measurement portion is large, it is necessary that the characteristic portion is excluded from the measuring portion and that another characteristic portion is determined as the measuring portion.

In order to appropriately determine the measuring portion or the measuring method, it is necessary to consider a large number of conditions such as a size, shape and fluctuation of the work and an accuracy of the visual sensor and a characteristic of the handling mechanism. However, it is an actual condition that the repetition of trial and error has been needed in the job site up to this time, in order to raise the system. In the case where the system has been raised by a user without accurately understanding these necessary conditions and a relation between the measuring portion and measuring method, even if the system is fortunately, excellently operated at first, trouble may be caused after that, for example, the system is stopped once a day, and it is difficult to specify the cause of the trouble. This problem becomes a heavy burden for the user, which becomes a cause of obstructing the introduction of the visual sensor robot system.

It is an object of the present invention to provide a robot program generating device capable of solving the above problems of the prior art. It is also an object of the present invention to provide a robot program analyzing device capable of analyzing the generated robot program. That is, it is an object of the present invention to reduce a burden imposed on a user in such a manner that know-how to use a visual sensor is incorporated into a device, which is capable of generating or analyzing a teaching program of a robot, such as a robot simulator, and a proposal and judgment can be made with respect to a work size, measuring position, measuring condition and correcting method etc.

SUMMARY OF THE INVENTION

First, the present invention solves the above problems by a robot program generating device for generating a robot operating program.

According to aspect 1, a robot program generating device for generating a robot operating program, comprises: a means for displaying a work model; a means for designating a measuring portion measured by a visual sensor on the displayed work model; a means for designating a measuring method for measuring the measuring portion; a means for designating information about the work; a means for storing reference information for judging whether or not the measuring portion is good and/or whether or not the measuring method is good corresponding to the designated information; a means for judging whether or not the designated measuring portion is good and/or whether or not the designated measuring method is good according to the reference information; and a means for generating a robot program according to the designated measuring portion and/or the measuring method, the robot program including a measuring command for executing the measurement of the designated measuring portion and/or a measuring command for executing the measurement according to the designated measuring method.

According to aspect 2, a robot program generating device for generating a robot operating program, comprises: a means for displaying a work image which has been previously snapped; a means for designating a measuring portion measured by a visual sensor on the displayed work image; a means for designating a measuring method for measuring the measuring portion; a means for designating information about the work; a means for storing reference information for judging whether or not the measuring portion is good and/or whether or not the measuring method is good corresponding to the designated information; a means for judging whether or not the designated measuring portion is good and/or whether or not the designated measuring method is good; and a means for generating a robot program according to the designated measuring portion and/or the measuring method, the robot program including a measuring command for executing the measurement of the designated measuring portion and/or a measuring command for executing the measurement according to the designated measuring method.

In these inventions, the information about the work can include at least one of the work size, the work material, the work gripping method and the work loading state (aspect 3).

The robot program generating device can be a robot simulator having a function of executing a simulation for the robot program (aspect 4).

Next, the present invention solves the above problems by a robot program analyzing device for analyzing a robot operating program.

A robot program analyzing device for analyzing a robot operating program of aspect 5 comprises: a means for inputting and analyzing a robot program; a means for displaying a work model; a means for displaying a measuring portion measured by a visual sensor from the analyzed program on the displayed model; a means for displaying a measuring method for measuring the measuring portion; a means for designating information about the work; a means for storing reference information for judging whether or not the measuring portion is good and/or whether or not the measuring method is good corresponding to the information about the work; and a means for judging whether or not the measuring portion is good and/or whether or not the measuring method is good in the program according to the reference information.

A robot program analyzing device for analyzing a robot operating program of aspect 6 comprises: a means for inputting and analyzing a robot program; a means for displaying a work image which has been previously snapped; a means for displaying a measuring portion measured by a visual sensor from the analyzed program on the work image; a means for displaying a measuring method for the measuring portion; a means for designating the information about the work; a means for storing reference information for judging whether or not the measuring portion is good and/or whether or not the measuring method is good corresponding to the information about the work; and a means for judging whether or not the measuring portion is good and/or whether or not the designated measuring method is good in the program according to the reference information.

In these robot program analyzing devices, the information about the work can include at least one of the work size, the work material, the work gripping method and the work loading state (aspect 7).

A robot simulator having a function of executing a simulation for the robot grogram can be employed as a robot program analyzing device (aspect 8).

A summary of the operation of the present invention will now be given below.

In the robot program generating device of the present invention (aspects 1 to 4), a view of the work model or a snapped image of the work is displayed. On the displayed work model or on the displayed snapped image of the work, a measuring method of the work or a measuring portion of the work is designated. Further, the information about the work is designated. Based on the foregoing, it is judged whether or not the work measuring method and the work measuring portion are appropriate. Further, when they are appropriate, a robot program including a command of measurement is generated.

A robot program analyzing device according to the present invention (aspects 5 to 8) reads and analyzes a robot program and displays the work model or an image of the work which has been snapped, and further displays a work measuring method and a work measuring position on the displayed work model or the displayed image of the work. Further, by designating the information about the work, it is judged whether or not the work measuring method and the work measuring portion are appropriate.

According to the robot program generating device of the present invention, the judgment of appropriateness of the measuring portion and the measuring method, which was conventionally conducted by a user in a job site by the method of trial and error, can be previously conducted. According to the robot program analyzing device of the present invention, even after the system has been constructed, the appropriateness of the system can be verified. Therefore, it becomes easy to specify the cause of a system problem which has occurred during the operation.

Further, due to the effects described above, a burden which is imposed on a user in the system using the visual sensor can be reduced. Therefore, it can be expected that the introduction of the system will be facilitated.

These and other objects, features and advantages of the present invention will be more apparent in light of the detailed descriptions of exemplary embodiments thereof as illustrated by the drawings.

BRIEF DESCRIPTION OF THE DRAWINGS

In the drawings:

FIG. 5a and FIG. 5b are flow charts showing an outline of the processing for making a diagnosis on a measurement error in the embodiment;

FIG. 6 is a flow chart showing an outline of the processing for making a diagnosis on gripping displacement in the embodiment;

FIG. 7 is a flow chart showing an outline of the processing for making a diagnosis on the influence of deflection of the work in the embodiment;

FIG. 8 is a flow chart showing an outline of the flow of the entire diagnosis in the embodiment;

FIG. 9 is a view for explaining a method of calculation of the maximum gripping error in "another item 1";

FIG. 10 is a view for explaining a method of calculation of the maximum gripping error in "another item 2";

DETAILED DESCRIPTION

Figure 1:
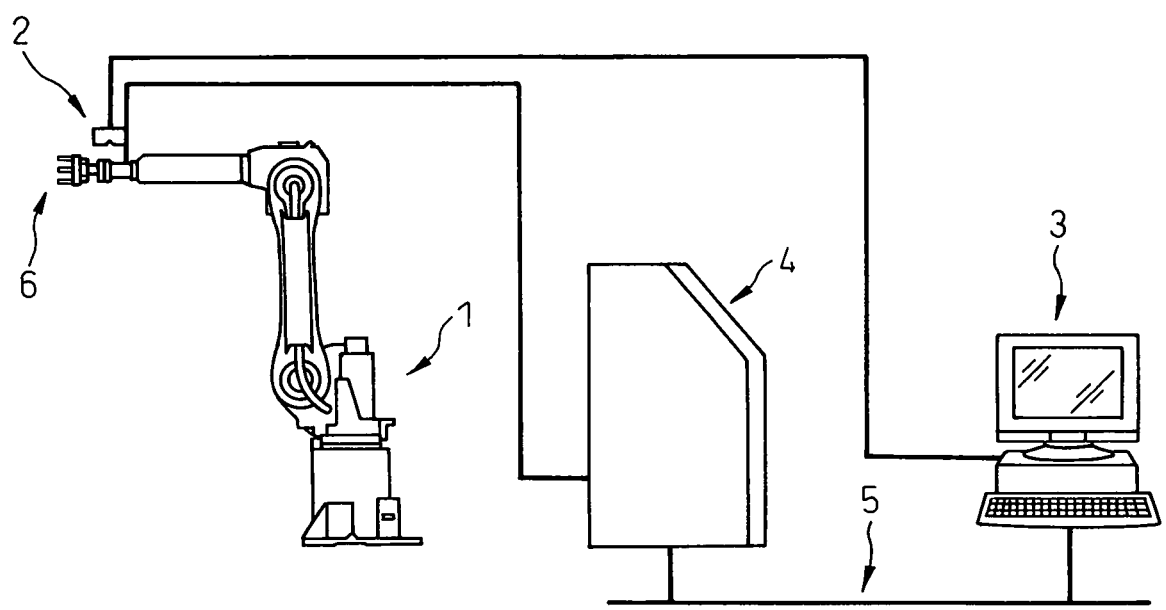
FIG. 1 is an overall arrangement view of an embodiment of the present invention.

FIG. 1 is a view showing an outline of the overall arrangement of one embodiment of the present invention. In FIG. 1, reference numeral 1 designates a robot to handle an article (not shown) such as a work. In the neighborhood of the wrist of the robot, the video camera 2 and the hand 6 are attached. The video camera 2 functions as a sensor head of the visual sensor. The personal computer 3, which will be referred to as a computer hereinafter, controls the operation of picking up an image conducted by the video camera 2 and processes an image which has been snapped. The robot 1 is connected to the robot controller 4, and the robot controller 4 and the computer 3 are connected to each other by the network line 5.

The computer 3 functions as a controller for controlling the visual sensor on line. On the other hand, the computer 3 functions as a robot simulator used for both the robot program generating device and the robot program analyzing device off line. The computer 3 is provided with a monitor 90 (for example, a liquid crystal display device) and a manual operating section 91 (such as a keyboard, mouse and so forth) in a well-known connecting method. The monitor 90 displays a snapped image and a processed image obtained when the image, which has snapped before, is processed on line or off line. The monitor 90 is used to display off line an image of the work model or the robot model used for off-line programming. The monitor 90 is also used to display off line an image previously snapped by the video camera 2. The manual operating section 91 is used for inputting various data onto the image plane on which the above image is displayed. That is, the manual operating section 91 functions as a measuring portion designating means 91a for designating the measuring portion, a measuring method designating means 91b for designating the measuring method and a work information designating means 91c for designating the work information described later.

In this connection, the visual sensor used in this embodiment is of the type in which the video camera 2 is used as a sensor head. However, as necessary, the other type of visual sensor may be used, for example, the visual sensor may be replaced with a three-dimensional type visual sensor by which a three-dimensional position and posture of the object can be recognized by projecting a beam of reference light such as a beam of slit light.

Figure 2:
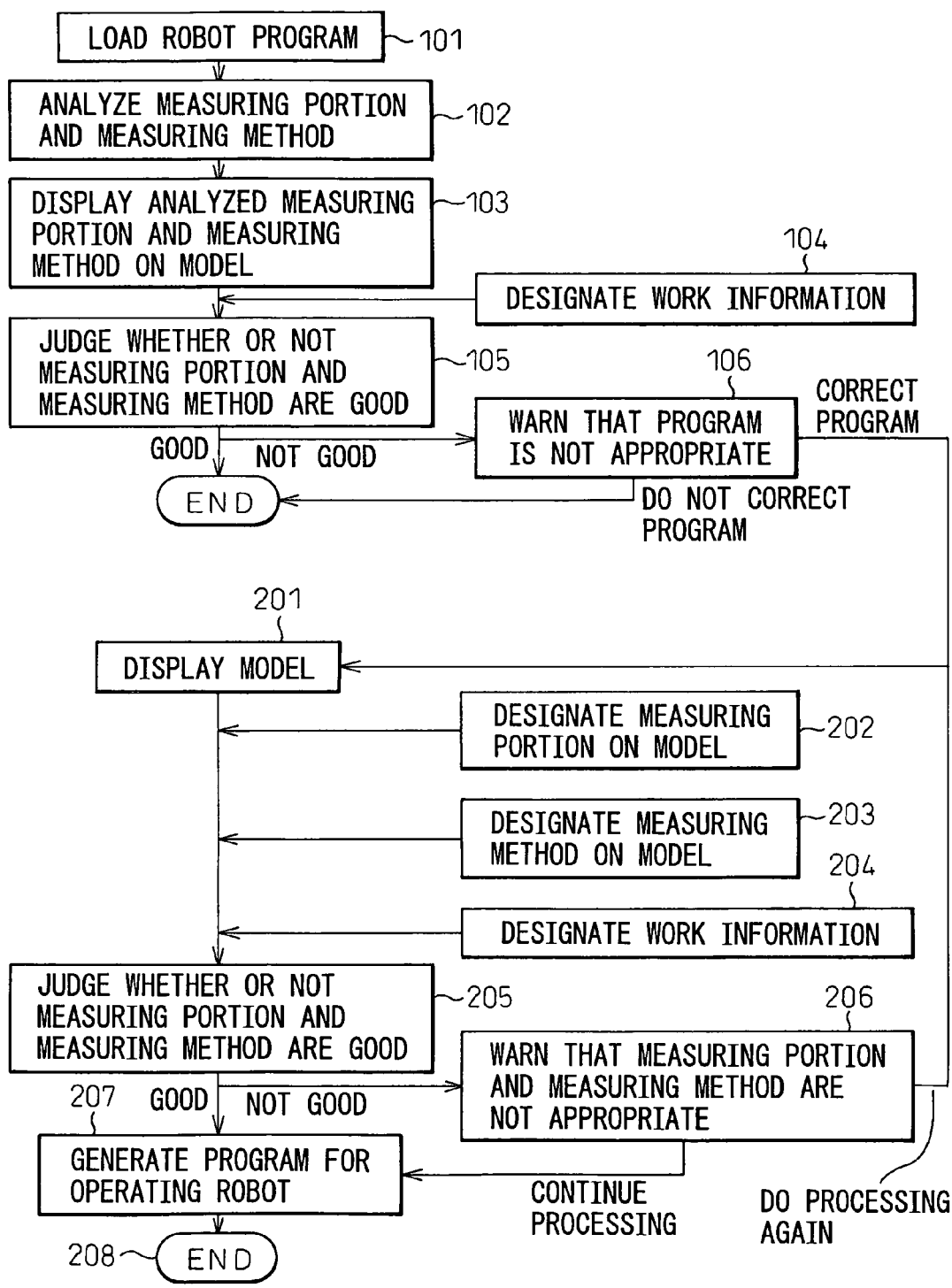
FIG. 2 is a flow chart showing an outline of the processing executed in the embodiment.
Figure 11:
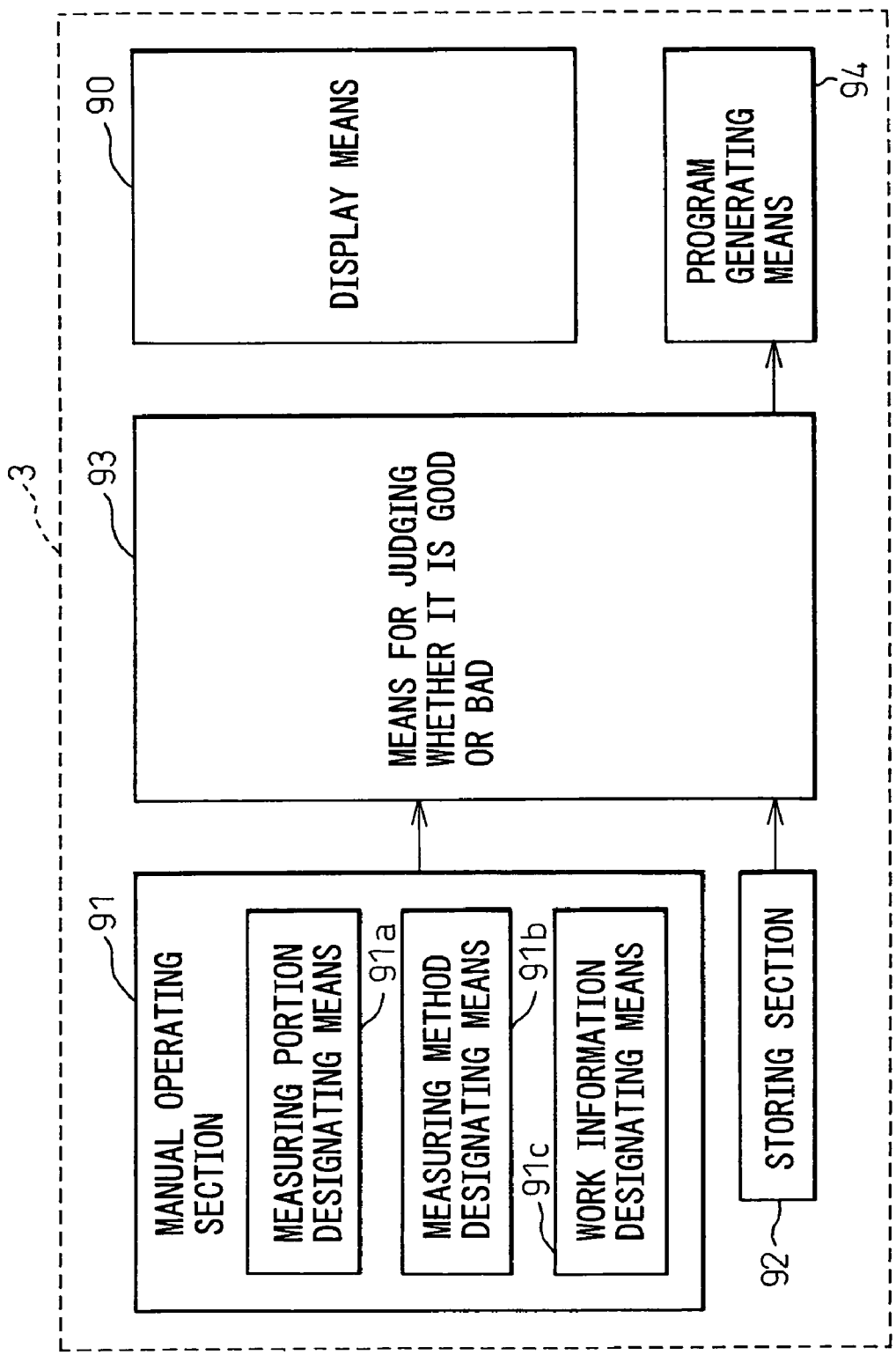
FIG. 11 is a block diagram in the case where a computer is used for the robot program generating device.

FIG. 2 is a flow chart showing an outline of the processing when the present invention is executed while the computer 3 used as a robot simulator is made to function as a robot program generating device and a robot program analyzing device. In this connection, the processing step numbers of 100 level correspond to the function as a robot program analyzing device, and the processing step numbers of 200 level correspond to the function as a robot program generating device. In this connection for the convenience of explanations, the processing (the function as a robot program generating device) to which the step numbers of 200 level are numbered, will be first explained. At this time, FIG. 11 is appropriately referred to, and which is a block diagram in the case where the computer 3 is used as the robot program generating device.

First, a model of the work is displayed on the monitor 90 of the robot simulator (step 201). In this case, the robot simulator is the computer 3, which is the same in the following explanations. As well known, for example, a model of the designing data of CAD can be utilized for this display model. Instead of the model, an image of the work corresponding to the model may be snapped by the video camera 2 so as to take in the data of the work. Then, the image of the work may be displayed on the monitor 90. In this case, an image displayed on the monitor 90 is represented by the "model" including the "image", which is the same in the following explanations.

Next, a portion to be measured, namely measuring portion, is designated in the model displayed on the monitor 90 (step 202). This designation is conducted by an operator with the manual operating section 91 such as a mouse. At the time of designation, it is possible to employ a system in which the operator arbitrarily selects a portion to be measured. Except for the above system, it is possible to employ a system in which portions in the designing model, the contrast of which is judged to become clear, such as a sharp step portion and a hole portion, are automatically selected with the robot simulator and presented on the image plane, and the operator selects one of the selected portions. In the case where an image, which has been snapped, is used, portions in the actual image, the contrast of which is clear, are presented while the portions are emphasized being turned on and off, and of the thus emphasized portions may be selected by the operator.

Next, the measuring method for the above measuring portion is designated (step 203). Usually, either the two-dimensional measurement made by the video camera 2 or the three-dimensional measurement made by the three-dimensional visual sensor is selected. This designation is conducted by the operator with the manual operating section 91 such as a keyboard. In this connection, the processing described in steps 202 and 203 may be repeated when necessary so as to conduct measurements on a plurality of portions.

Next, information about the work, which will be abbreviated as "work information" hereinafter, is designated by the manual operating section 91 (step 204). The typical work information is data of the work size, the work material, the work gripping method and the work loading state. In this case, the work size, the work material, the work gripping method and the work loading state are designated by numerical values. Concerning this matter, specific examples are described later.

Next, it is judged whether or not the measuring portion and the measuring method are good (step 205). For example, the rule applied to the above judgment of the measuring portion is whether or not the contrast capable of stably detected by the visual sensor is obtained at the measuring portion. Another rule applied to the judgment of the measuring portion is that, for example, in the case a work is a thin metallic sheet, since an end portion of the work is easily bent or flexible, the end portion of the work is not appropriate as the measuring portion. The rule applied to the judgment of the measuring method is that when the work is stably loaded, the two-dimensional measuring method may be employed. However, when the work is loaded unstably, it is necessary to designate the three-dimensional measuring method. Another rule to be applied to the judgment of the measuring method is described as follows. In the case of a work of a large size, for example, in the case of a work, the maximum diameter of which is not less than 1 m, it is necessary to measure at least two portions which are separate from each other by the distance of not less than 50 cm. Another rule to be applied to the judgment of the measuring method is described as follows. In the case where the degree of absorbing an error of the gripping method is large, even in the aforementioned work of a large size, it is sufficient to use only one measuring portion. These rules are stored in the storage section 92 of the computer 3 as the reference information for judging whether or not the measuring portion and/or the measuring method is good. According to these rules, whether or not the measuring portion and/or the measuring method is good is judged by the judging means 93 of the computer 3.

In the case where the measuring portion and/or the measuring method is judged to be good, the robot operation except for the measuring operation is made off line by using the function of the robot simulator. Further, a command of calling the measuring method with respect to the measuring portion, which has been set above, is added, so as to generate a robot program by the robot program generating means 94 of the computer 3 (step 207). After that, the processing is completed (step 208).

On the other hand, in the case where the measuring portion and/or the measuring method is judged not to be good, an alarm in which that the present setting is not appropriate (step 206) is given to the operator, the operator directs, whether the processing is continued or the processing is done over again. When the operator directs to continue the processing, the process is transferred to step 207. When the operator directs to do the processing over again, the program is transferred to step 201, so that the processing is redone from the very beginning. In this connection, a specific example of the judgment will be described later.

Figure 12:
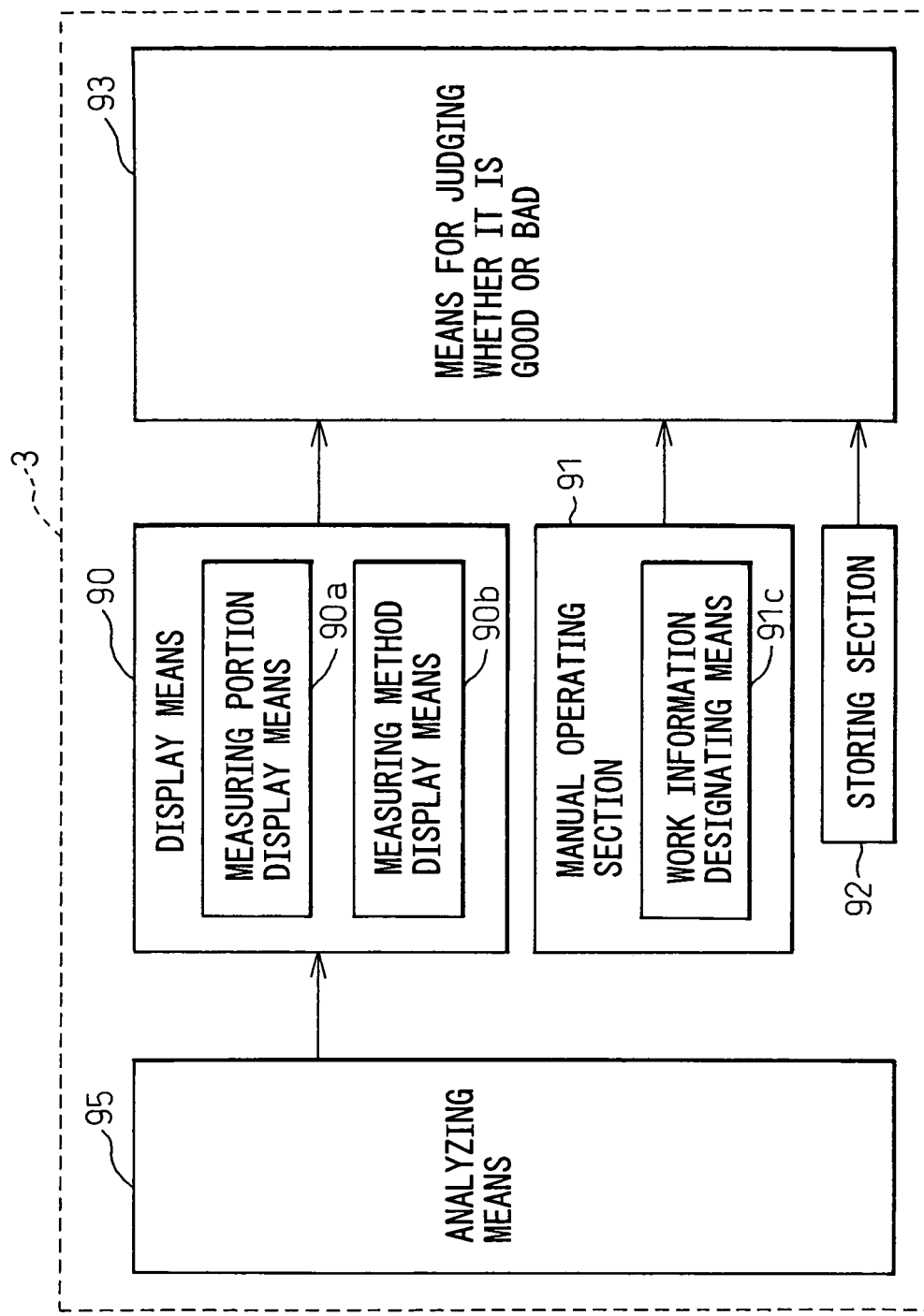
FIG. 12 is a block diagram in the case where a computer is used for the robot program analyzing device.

Next, processing (the function as a robot program analyzing device) to which the step numbers of 100 level are numbered, are explained. In this case, reference should be appropriately made to FIG. 12 which is a block diagram in the case where the computer is used as a robot program analyzing device.

First, a robot program is loaded to the robot simulator (step 101). For example, this robot program is a program made through the above processing. Alternately, this robot program is a program which was used in the actual system; however, trouble was caused in the system.

Next, from the loaded program, the robot simulator (the analyzing means 95 of the computer 3) analyzes which measuring portion of the work was measured and which measuring method was used (step 102). Then, the model of the work is displayed on the monitor 90, and then the measuring portion and the measuring method, which were analyzed before, are displayed in the model on the monitor 90 by using the measuring portion display means 90a and the measuring method display means 90b (step 103). It is considered that the model to be displayed is a model of the designing data of CAD as in the case of step 201. An image snapped by a video camera may be displayed instead of the model. In order to successfully overlay the model on the analyzed position, for example, the image plane at the time when this program was made by the robot simulator may be stored in another way.

Next, information about the work, namely work information, is designated (step 104). As described before, this work information is data in which the work size, the work material, the method of gripping the work and the state of loading the work have been previously coded. In step 104, the operator appropriately combines and designates the work information.

Then, the measuring portion and/or the measuring method, which were analyzed, are judged by the judging means 93 (step 105). Concerning this judgment, in the same manner as that of the above step 205, the judgment is made with the rule (the reference information) stored in the storage section 92. In the case where it is judged to be good, the processing is finished as it is (step 107). In the case where it is judged not to be good, an alarm in which that the present program is not appropriate is given to the operator (step 106), and the operator directs whether or not the program is corrected. When the operator directs that the program is not corrected, the process is finished as it is (step 107). When the operator directs that the program is corrected, the process is transferred to step 201, and the program is corrected by using the same process as that of generating the program.

As described above, according to the present invention, the measuring portion and the measuring method are judged to be good or not good in both the case of program generation (including the case of correction) and the case of program analysis. Therefore, this judgment whether it is good or not will be more specifically explained in the following descriptions.

Diagnosis on Measurement Error

Figure 3:
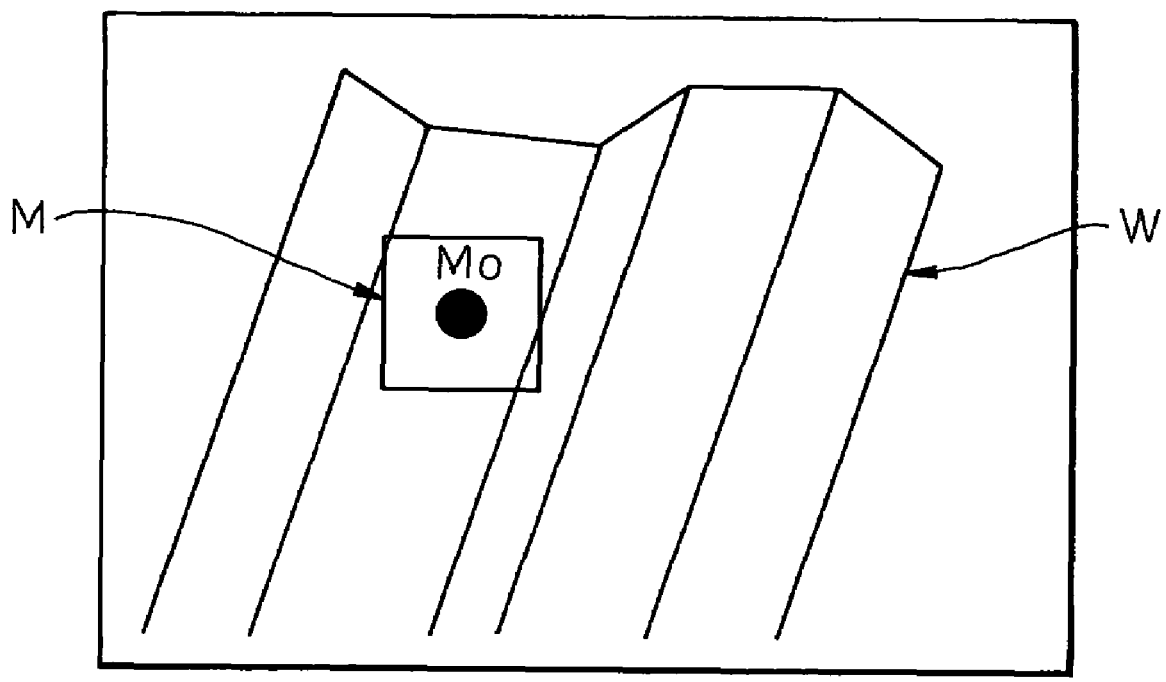
FIG. 3 is a view showing an example of the work model (or the work image) and the measuring portion, which are displayed on an image plane, in the embodiment.

Items to be checked here are described as follows. One item is whether or not the measuring method appropriate for a state of loading is selected. The other item is whether or not the appropriate measuring portion is selected from the viewpoint of comparison of the estimated measuring error with the allowable error which has been set. A specific work model (or an image) is shown in FIG. 3. The entire work model shown on the image plane is represented by the reference mark W in FIG. 3. The measuring portion (the image portion snapped by the video camera 2 in this case) represented by the reference mark M corresponds to the measuring portion designated in the above step 202 or "the analyzed measuring portion" in the above step 103. Point M0 is a point representing the measuring portion M, for example, Point M0 is the gravity center of the image.

Figure 4:
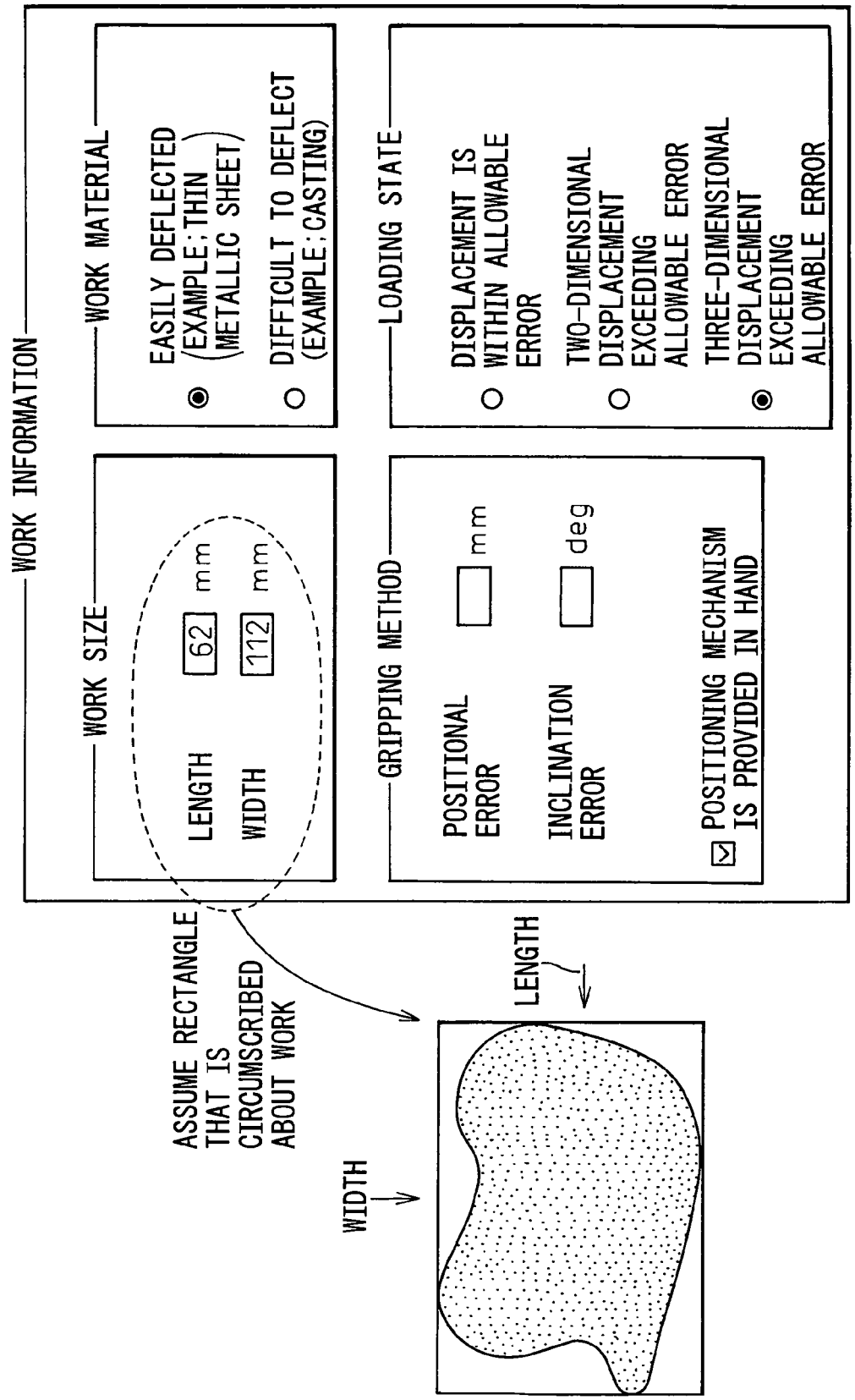
FIG. 4 is a view for explaining an example of the designation of the work information in the embodiment.

The work information is shown in the right half of FIG. 4. The work information is designated in such a manner that numerical values or types with respect to the work size, the work material, the work gripping method and the work loading are designated by the manual operating section 91. Concerning the work size, as shown in the left half of FIG. 4 being generalized, a rectangle coming into contact with the work model is found by means of image processing, and the length and width are determined in consideration of displaying magnification. The thus obtained numerical values are employed. In this connection, the numerical values 62 mm and 112 mm shown in FIG. 4 are merely examples.

Concerning the work material, the type of the material is designated in terms of whether it is a flexible material such as a thin metallic sheet or it is not a flexible material such as a casting. In this case, the former is designated as an example.

Concerning the gripping method of the work, in the case where there is a limit in the positional error (for example, the error of the detecting position of the point M0 in FIG. 3) capable of being allowed at the time of positional detection conducted by the visual sensor or in the case where there is a limit in the inclination error (for example, the detection error of the inclination of the work W in FIG. 3) capable of being allowed, the operator inputs numerical values concerning these limits. In this connection, these numerical values are determined on the basis of the performance of the handling mechanism or hand. When the work can be positioned with a sufficiently large capacity of absorbing the error, the item "positioning mechanism in hand" is designated as exemplarily shown here.

Concerning the loading state of the work, the following three types are designated according to the irregularity of the way of putting the work. They are: "the displacement is within allowable error", that is, the individual works are approximately accurately positioned; "the two-dimensional displacement exceeding the allowable error is caused", that is, although the height positions are approximately the same, the positions on the plane are not definite; and "the three-dimensional displacement exceeding the allowable error is caused", that is, the works are loaded in bulk. In this case, an example is taken up and designated in which "the three-dimensional displacement exceeding the allowable error is caused".

FIG. 5a and FIG. 5b are flow charts showing an outline of the processing for conducting diagnosis of the measuring error. First, as the step of preparation, the number of points designated for the measurement is read in. Next, according to the content of the setting of the loading state included in the work information, the processing to be conducted after is classified (step 301). When the setting of the loading state is "the displacement is within the allowable error" (step 302), the process is finished as it is (step 319).

When the setting of the loading state is "the two-dimensional displacement exceeding the allowable error" (step 303), the gripping error is calculated from the previously estimated measurement accuracy and the work size (step 305). In this case, consideration may be given only to the positional error. The method of calculation will be described in another item 1. The gripping error is compared with the allowable error (the limits of the positional error and the inclination error) which has been set in the setting of the gripping method (step 306). In the case where the gripping error is not larger than the allowable error, the process is finished as it is (step 319). In the case where the gripping error is larger than the allowable error, the process proceeds to step 307, and it is judged whether or not the second measuring portion is present. Unless the second measuring portion is present, the error flag 2 is set (step 318) and the processing is finished (step 319).

When the second measuring portion is present, the maximum gripping error at the time of gripping both end portions of the work is calculated from the positions of the first and the second measuring portion (the representative points), the accuracy of measurement and the work size (step 308). An example of the method of calculation will be described later in another item 1. The gripping error is compared with the allowable error (the limits of the positional error and the inclination error) which has been set in the setting of the gripping method (step 309). When the gripping error is not larger than the allowable error, the process is finished as it is (step 319). When the gripping error is larger than the allowable error, after the error flag 2 is set (step 318), the processing is finished (step 319).

In the case where the setting of the loading state is "the three-dimensional displacement exceeding the allowable error" (step 304), it is checked whether or not the measuring method of the first measuring portion is 3D measurement (the three-dimensional measurement) (step 310). When the measuring method of the first measuring portion is not 3D measurement (the three-dimensional measurement), that is, when the measuring method of the first measuring portion is 2D measurement, the error flag 1 is set (step 311), and the maximum gripping error at the time of gripping both end portions of the work is calculated from the previously estimated measuring accuracy and the work size (step 312). In the case where the measuring method of the first measuring portion is 3D measurement, the error flag 1 is not set and the process proceeds to step 312 and the gripping error is calculated in the same manner. In this case, it is necessary to diagnose both the positional error and the inclination error. An example of the method of calculation will be described in another item 2.

Next, the gripping error is compared with the allowable error (the limits of the positional error and the inclination error) which has been set in the setting of the gripping method (step 313). When the gripping error is not larger than the allowable error, the process is finished as it is (step 319).

When the gripping error is larger than the allowable error, the presence of the measuring portions after the second point is checked for (step 314). When the measuring portions after the second point are not present, the error flag 2 is set (step 318) and the processing is finished (step 319). When the gripping error is larger than the allowable error and further the measuring portions after the second point are present, it is checked whether or not the measuring method of these measuring portions is 3D measurement (step 315). When either of the measuring methods of these measuring portions is not 3D measurement, the error flag 2 is set (step 318) and the processing is finished (step 319). When all of the measuring methods of these measuring portions are 3D measurement, with respect to these points, the maximum gripping error at the time of gripping both end portions of the work is calculated from the previously estimated measuring accuracy and the work size (step 316).

The gripping error is compared with the allowable error (the limits of the positional error and the inclination error) which has been set in the setting of the gripping method (step 317). When the gripping error is not larger than the allowable error, the process is finished as it is (step 319). When the gripping error is larger than the allowable error, after the error flag 2 is set (step 318), and the processing is finished (step 319).

As described above, the diagnosis made for the measuring error is completed. When neither the error flag 1 nor the error flag 2 is set, the result of the diagnosis is "good". When either the error flag 1 or the error flag 2 is set, the result of the diagnosis is "not good".

Diagnosis Made for Displacement

In the case where the work and the hand are displaced from each other after the work has been gripped by the hand, although the work has been correctly gripped, there is a high possibility of the occurrence of trouble when the work is conveyed to the next process. Therefore, the diagnosis is conducted according to the procedure shown in the flow chart of FIG. 6. That is, it is judged whether or not "The positioning mechanism is provided in the hand." (shown in FIG. 4) of the gripping method is set (step 401). When it is set, the process is finished as it is (step 403). When it is not set, the error flag 3 is set (step 402) and then the process is finished (step 403).

Diagnosis Made for Influence of Deflection of Work

For example, in the case a work is a thin metallic sheet, its peripheral portion is likely to deflect. This deflection causes an error which cannot be estimated as far as it is measured every time. Therefore, the possibility of the occurrence of the influence caused by the deflection will be diagnosed by the procedure shown in the flow chart of FIG. 7.

It is judged whether or not "It is easily deflected." is selected in the setting of the work material (step 501) (shown in FIG. 4). When "It is easily deflected." is not selected, the processing is finished (step 505). When "It is easily deflected." is selected, it is judged whether or not the work size is larger than a predetermined value (step 502). Concerning the judging method, the length and width of the work may be compared with the respective predetermined values (the previously set upper limits). Alternatively, the numerical value of (length)×(width) may be compared with its upper limits. When the numerical value is not the predetermined value, the processing is finished (step 505).

In the case where the work size is larger than the predetermined value, with respect to all the measuring portions, it is judged whether or not these measuring portions are close to the peripheral portion of the work (step 503). For example, with respect to all the measuring portions, it is judged whether or not the distances from the edge line are shorter than a predetermined value (a previously set lower limit). When the distances from the edge line are longer than the predetermined value, that is, all the measuring portions are distant from the peripheral portion, it is judged that these measuring portions are seldom affected by the deflection, and the processing is finished (step 505). When the distances from the edge line are shorter than the predetermined value, that is, all the measuring portions are close to the peripheral portion, it is judged that these measuring portions are likely to be affected by the deflection, and the error flag 4 is set (step 504), and the processing is finished (step 505).

Next, referring to the flow chart of FIG. 8, an outline of the flow of the entire diagnosis including the above diagnosis will be explained below.

First of all, all error flags are cleared (step 601). Next, the data of measurement accuracy, which is previously estimated, is loaded (step 602). Successively, the diagnosis with respect to the measurement accuracy (step 603), the diagnosis with respect to the gripping displacement (step 604) and the diagnosis with respect to the measuring portion (the diagnosis of deflection) (step 605) are executed. Since the contents of these diagnoses have been explained before, the explanations are not repeated.

After all the diagnoses have been completed, the results are displayed. That is, it is successively checked whether or not the error flags 1 to 4 are set (steps 606, 608, 610, 612). When the error flags are set, the corresponding messages are displayed on the monitor 90 (steps 607, 609, 611, 613) and the processing is finished.

That is, when the error flag 1 is set, this means that 2D measurement was made at a portion where 3D measurement should be originally made. In the case where this portion is the point A, for example, the message that "The point A was not measured by 3D measurement." is displayed.

When the error flag 2 is set, this means that the measurement accuracy is not satisfied at the present measuring portion. Therefore, for example, the message that "Keep the measuring portion away from the present position." is displayed.

When the error flag 3 is set, this means that although the work has been gripped, there is a possibility the work is displaced before it is put in the process conducted later. Therefore, for example, the message that "Correct the displacement of the work again with the visual sensor before it is put, or arrange a positioning mechanism in the hand." is displayed.

When the error flag 4 is set, this means that there is a possibility that an error, which can not be estimated, is caused each time in the measuring portion. Therefore, the message that "Keep the measuring portion farther away from the peripheral portion." is displayed.

Finally, referring to "another item 1" and "another item 2" which are described below, the method of calculating the maximum gripping error in the above steps 305, 312 and so forth (shown in FIG. 5) will be explained.

Another Item 1

As shown in FIG. 9, the higher numerical value in the numerical values of the length and the width of the work is represented by "a" in the setting of the work size. Suppose that the estimated measurement error includes the positional error $E_p$ and the rotation (inclination) error $E_r$. The gripping error caused by the measurement error actually depends on the measuring portion and the gripping portion. However, in this case, the problem is simplified as follows. In the case where the measuring portion is located on one side of the work, on the assumption that the hand grips an end of the opposite side of the work, an error generated in this case is estimated. In most cases, the error found on this assumption is larger than the substantial gripping error. Therefore, when this error is used for the comparison of the allowed error, no problems are caused. In this connection, only the two-dimensional error is referred in this case. Therefore, this explanation of the error has no relation with the inclination error.

(1) In the Case of Only One Measuring Portion

When the gripping position is P (vector) in the case where no error is caused in the measurement and the gripping position is P' (vector) in the case where an error is caused in the measurement, and when consideration is given to that the rotation error Er is very small, the value to be found can be expressed by the following expression.

$$|P-P'|=|E_p|+a|E_r|$$

In this connection, the mark | | expresses an absolute value.

(2) In the Case of a Plurality of Measuring Portions

A set of a plurality of portions, the distance between which is the longest, are selected, and the distance is expressed by D. In the same manner as that of the above item (1), when the gripping position is P in the case where no error is caused in the measurement and the gripping position is P' in the case where an error is caused in the measurement, only $E_p$ is related here. The value to be found can be expressed by one of the following expressions.

$$|P-P'|=|E_p|(2a/D-1) \text{ and } |P-P'|=|E_p|$$

The higher numerical value in the numerical values expressed by the above expressions is a value to be found.

Another Item 2

As shown in FIG. 10, the higher numerical value in the numerical values of the length and the width of the work is represented by "a" in the setting of the work size. Suppose that the estimated measurement error includes the positional error $E_p$, the inclination error $E_i$ and the rotation error Er. In the same manner as that described in another item 1, the gripping error caused by the measurement error actually depends on the measuring portion and the gripping portion. However, in this case, the problem is simplified as follows. In the case where the measuring portion is located on one side of the work, on the assumption that the hand grips an end of the opposite side of the work, an error generated in this case is estimated. In most cases, the error found on this assumption is larger than the substantial gripping error. Therefore, when this error is used for the comparison of the allowed error, no problems are caused.

The inclination error is related to a case in which although the position is accurate, the hand can not successfully grip the work unless the gripping motion of the hand is conducted perpendicularly to the work face. From the above definition, the inclination error is $|E_i|$.

(1) In the Case of One Measuring Portion

When the gripping position is P in the case where no error is caused in the measurement and the gripping position is P' in the case where an error is caused in the measurement, and when consideration is given to that the inclination error $E_i$ and the rotation error $E_r$ are very small, the value to be found can be expressed by the following expression.

$$|P-P'|=|E_p|+a\{(E_r)^2+(E_i)^2\}^{1/2}$$

(2) In the Case of a Plurality of Measuring Portions

A set of a plurality of portions, the distance between which is the longest, are selected, and the distance is expressed by D. When the gripping position is P in the case where no error is caused in the measurement and the gripping position is P' in the case where an error is caused in the measurement, only $E_p$ is related to the maximum gripping error. The value to be found can be expressed by one of the following expressions.

$$|P-P'|=|E_p|(2a/D-1) \text{ and } |P-P'|=|E_p|$$

The higher numerical value in the numerical values expressed by the above expressions is a value to be found.

Although the invention has been shown and described with exemplary embodiments thereof, it should be understood by those skilled in the art that the foregoing and various other changes, omissions and additions may be made therein and thereto without departing from the spirit and the scope of the invention.

The invention claimed is:

1. A robot program generating device for generating a robot operating program for a system including a robot and a visual sensor for conducting two-dimensional measurement or three-dimensional measurement to a work, comprising:
a model displaying means for displaying a work model;
a measuring portion designating means for designating a measuring portion measured by the visual sensor on the work model displayed by the model displaying means;
a measuring method designating means for designating as to whether a measuring method for measuring the measuring portion designated by the measuring portion designating means is the two-dimensional measurement or the three-dimensional measurement;
a work information designating means for designating information of at least one matter about the work by numerical values or types;
a rule storing means for storing predetermined rules for judging whether or not the measuring portion, which is designated by the measuring portion designating means, is good and/or whether or not the measuring method, which is designated by the measuring method designating means, is good in connection with the numerical values or types;
a judging means for judging whether or not the measuring portion which is designated by the measuring portion designating means, is good and/or whether or not the measuring method, which is designated by the measuring method designating means, is good according to the at least one matter about the work designated by the work information designating means and the rule stored by the rule storing means; and
a means for generating a robot program, the robot program including a measuring command for executing the measurement of the designated measuring portion, which is judged being good by the judging means by the designated measuring method, which is judged being good by the judging means.

2. A robot program generating device for generating a robot operating program for a system including a robot and a visual sensor for conducting two-dimensional measurement or three-dimensional measurement to a work, comprising:
a work image displaying means for displaying a work image which has been previously snapped;
a measuring portion designating means for designating a measuring portion measured by the visual sensor on the work image displayed by the work image displaying means;
a measuring method designating means for designating as to whether a measuring method for measuring the measuring portion designated by the measuring portion designating means is the two-dimensional measurement or the three-dimensional measurement;
a work information designating means for designating information of at least one matter about the work by numerical values or types;
a rule storing means for storing predetermined rules for judging whether or not the measuring portion, which is designated by the measuring portion designating means, is good and/or whether or not the measuring method, which is designated by the measuring method designating means, is good in connection with the numerical values or types;
a judging means for judging whether or not the measuring portion, which is designated by the measuring portion designating means, is good and/or whether or not the measuring method, which is designated by the measuring method designating means, is good according to the at least one matter about the work designated by the work information designating means and the rule stored by the rule storing means; and
a means for generating a robot program, the robot program including a measuring command for executing the measurement of the designated measuring portion, which is judged being good by the judging means by the designated measuring method, which is judged being good by the judging means.

3. A robot program generating device according to claim 1 or 2, wherein the at least one matter includes at least one of the work size, the work material, the work gripping method and the work loading state.

4. A robot program generating device according to claim 1 or 2, wherein the robot program generating device is a robot simulator having a function of executing a simulation for the robot program.

5. A robot program analyzing device for analyzing a robot operating program, for a system including a robot and a visual sensor for conducting two-dimensional measurement or three-dimensional measurement to a work comprising:
an analyzing means for inputting and analyzing a robot program including a measuring command for measuring the work by the visual sensor;
a model displaying means for displaying a work model;
a measuring portion displaying means for measuring and displaying a measuring portion together with the model on the model displayed by the model displaying means according to an analyzing result of the robot program obtained from the analyzing means;
a measuring method displaying means for measuring and displaying as to whether a measuring method for measuring the measuring portion is the two-dimensional measurement or the three-dimensional measurement according to the analyzing result of the robot program obtained from the analyzing means;
a work information designating means for designating information of at least one matter about the work by numerical values or types;
a rule storing means for storing predetermined rules for judging whether or not the measuring portion is good and/or whether or not the measuring method is good in connection with the numerical values or types, each of the measuring portion and the measuring method are measured according to the analyzing result of the robot program obtained from the analyzing means; and
a judging means for judging whether or not the measuring portion is good and/or whether or not the measuring method is good according to the at least one matter about the work designated by the work information designating means and the rule stored by the rule storing means, each of the measuring portion and the measuring method are measured according to the analyzing result of the robot program obtained from the analyzing means.

6. A robot program analyzing device for analyzing a robot operating program for a system including a robot and a visual sensor for conducting two-dimensional measurement or three-dimensional measurement to a work, comprising:
an analyzing means for inputting and analyzing a robot program including a measuring command for measuring the work by the visual sensor;
an image displaying means for displaying a work image which has been previously snapped;
a measuring portion displaying means for measuring and displaying a measuring portion measured by the visual sensor together with the image on the image displayed by the image displaying means according to an analyzing result of the robot program obtained from the analyzing means;
a measuring method displaying means for displaying as to whether a measuring method for measuring the measuring portion is the two-dimensional measurement or the three-dimensional measurement according to the analyzing result of the robot program obtained from the analyzing means;
a work information designating means for designating information of at least one matter about the work by numerical values or types;
a rule storing means for storing predetermined rules for judging whether or not the measuring portion is good and/or whether or not the measuring method is good in connection with the numerical values or types, each of the measuring portion and the measuring method are measured according to the analyzing result of the robot program obtained from the analyzing means; and
a judging means for judging whether or not the measuring portion is good and/or whether or not the measuring method is good according to the at least one matter about the work designated by the work information designating means and the rule stored by the rule storing means, each of the measuring portion and the measuring method are measured according to the analyzing result of the robot program obtained from the analyzing means.

7. A robot program analyzing device according to claim 5 or 6, wherein the at least one matter includes at least one of the work size, the work material, the work gripping method and the work loading state.

8. A robot program analyzing device according to claim 5 or 6, wherein the robot program analyzing device is a robot simulator having a function of executing a simulation for the robot program.

* * * * *